United States Patent
Fox

[11] Patent Number: 5,365,298
[45] Date of Patent: Nov. 15, 1994

[54] CAMERA SHUTTER WITH OSCILLATION DAMPING

[75] Inventor: Myron E. Fox, Spencerport, N.Y.

[73] Assignee: Eastman Kodak Company, Rochester, N.Y.

[21] Appl. No.: 42,434

[22] Filed: Apr. 5, 1993

[51] Int. Cl.[5] .................................................. G03B 9/08
[52] U.S. Cl. ................................... 354/230; 354/234.1
[58] Field of Search .................. 354/230, 234.1, 259, 354/262, 264, 274, 250, 252, 256

[56] References Cited

U.S. PATENT DOCUMENTS

| | | | |
|---|---|---|---|
| 2,882,808 | 4/1959 | Hillman | 354/250 |
| 3,952,312 | 4/1976 | Douglas | 354/230 |
| 4,107,705 | 8/1978 | Hashimoto et al. | 354/230 |
| 4,218,121 | 8/1980 | Nakagawa et al. | 354/271 |
| 4,621,916 | 11/1986 | Petersen | 354/234.1 |
| 4,751,544 | 6/1988 | Saito | 354/452 |
| 4,779,114 | 10/1988 | Kobayashi | 354/234.1 |
| 5,045,873 | 9/1991 | Shinozaki et al. | 354/234.1 |

FOREIGN PATENT DOCUMENTS 63-276007  11/1988  Japan .

Primary Examiner—Michael L. Gellner
Assistant Examiner—Eddie C. Lee
Attorney, Agent, or Firm—David A. Howley

[57] ABSTRACT

A camera including a combined shutter and adjustable aperture is characterized by resilient means for uniformly dampening oscillations during operation. The combined shutter and aperture includes a stepper motor that drives a plurality of blades between a closed aperture blocking position and a plurality of open aperture defining positions. The blades and stepper motor are coupled by a drive train that increases friction in the drive train uniformly in all positions of the blades. A counter weight is provided for balancing inertial forces on said ring.

7 Claims, 2 Drawing Sheets

CAMERA SHUTTER WITH OSCILLATION DAMPING

BACKGROUND OF THE INVENTION

1. Field of the Invention

This invention relates to the field of photography, and more specifically to a combined shutter and adjustable aperture in a photographic camera including a plurality of blades and a stepper motor for moving the blades between a closed position and multiple open or exposure positions.

2. Description of the Prior Art

It is known in the prior art to provide apparatus that combines the photographic functions of an adjustable exposure aperture and a shutter. Typically two rectangular blades, each including a tear-shaped hole therein, are mounted for relative reciprocating movement between a closed position and a plurality of open positions. In the closed position the holes are offset and the blades act as a shutter to block exposures. In the open positions the holes overlap by increasing amounts to define multiple exposure apertures that increase in size with the amount of overlap of the holes in the blades. Frequently the blades are driven between their respective positions by a stepper motor under the influence of a control circuit. The control circuit includes sensors which determine the exposure conditions of the subject. It then actuates the motor to drive the blades open to the appropriate aperture. The control also determines a suitable time interval for the exposure at that aperture and energizes the motor to close the blades.

PROBLEM SOLVED BY THE INVENTION

Although combined apertures and shutters provide many advantages, they also present special problems, particularly when the functions are combined in an iris-type mechanism. These problems are aggravated by the normal properties of stepper motors, which can impose high torque and rapid transitions for mechanical linkages, causing oscillations, bounding and ringing at resonate frequencies. Even small deviations from the desired mechanical movement can degrade results when the impact is reflected in both aperture size and exposure duration. At small apertures and short exposure durations, such deviations can result in a significant variance from the desired exposure value.

Some existing devices use the control circuit to provide special driving pulses according to a program designed to minimize oscillations. Such approaches increase the complexity of the mechanism and may reduce exposure options to those consistent with the program.

SUMMARY OF THE INVENTION

The present invention is directed to overcoming one or more of the problems set forth above. Briefly summarized, according to one aspect of the invention, a camera is provided with a combined shutter and aperture having a plurality of blades coupled to a stepper motor for controlling movement of the blades between a closed position, acting like a shutter, and a plurality of open positions defining exposure apertures. The camera is characterized by mechanical structure for uniformly dampening oscillations caused by operation of the stepper motor. According to one feature, the blades and stepper motor are coupled by a drive train including a resilient element that urges gear sectors in the train radially together uniformly in the closed and open positions of said blades. According to another feature, an actuator ring is provided having first and second radially opposed extensions. One extension carries a gear sector, while the opposed extension carries a counterweight for balancing the mass of the sector and balancing inertial forces on said ring.

ADVANTAGEOUS EFFECTS OF THE INVENTION

The invention dampens oscillations in the drive train of a camera shutter to improve control of the exposure cycle. It is particularly suited for use with a stepper motor in a shutter mechanism that also defines the exposure aperture, and improves the operation of such a mechanism with simple, inexpensive mechanical structure that adds resistance substantially uniformly during opening of the shutter. It thereby eliminates the need for special driving pulses or other electronic compensation to reduce the impact of high torque and rapid transients associated with stepper motors.

Other advantages and features of the invention will be more clearly understood and appreciated from a review of the following detailed description of the preferred embodiment, from the appended claims, and be reference to the accompanying drawings.

DESCRIPTION OF THE PREFERRED EMBODIMENTS

Figure 1:
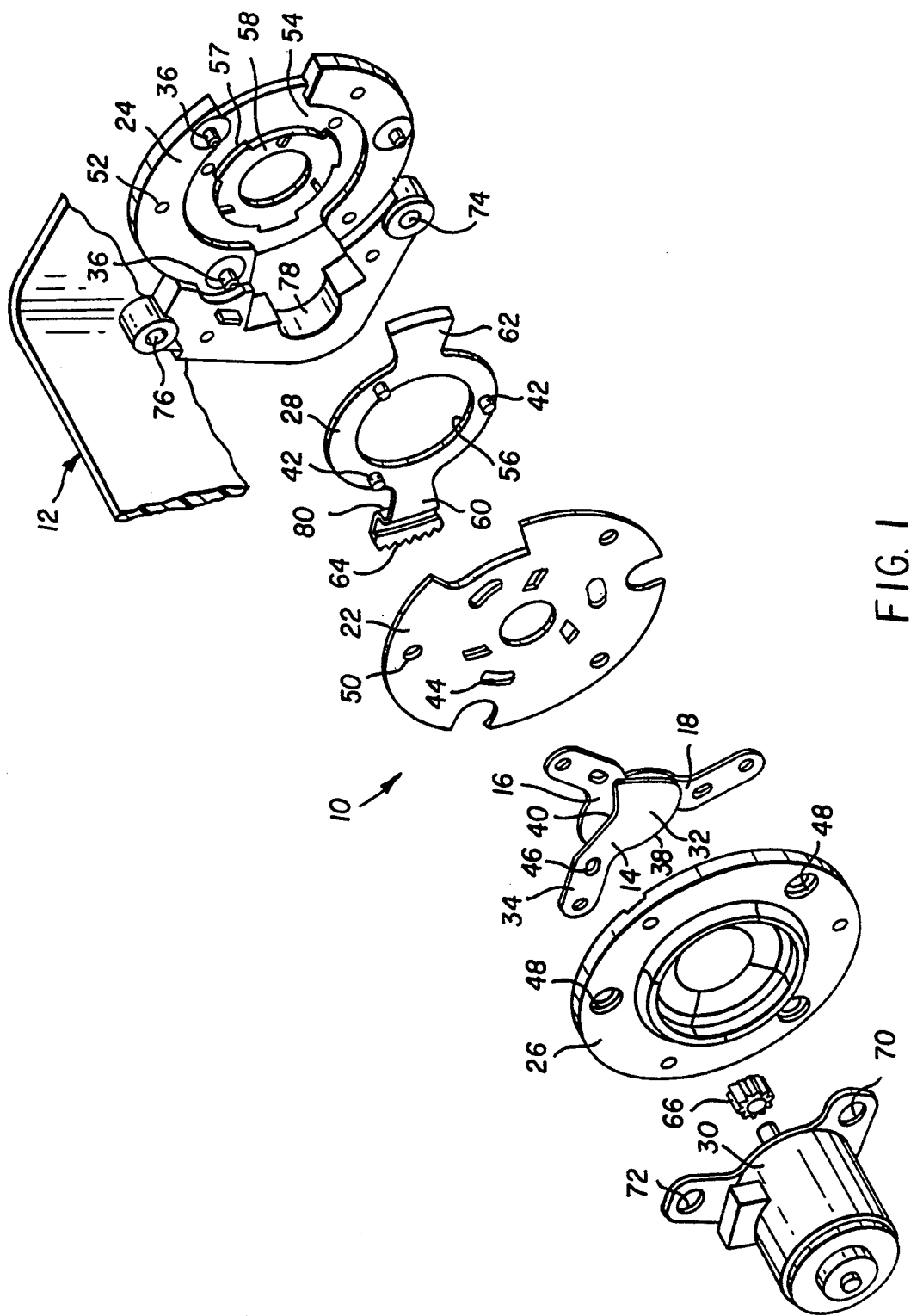
FIG. 1 is an exploded view of a combined aperture and shutter depicting a preferred embodiment of the invention.
Figure 3:
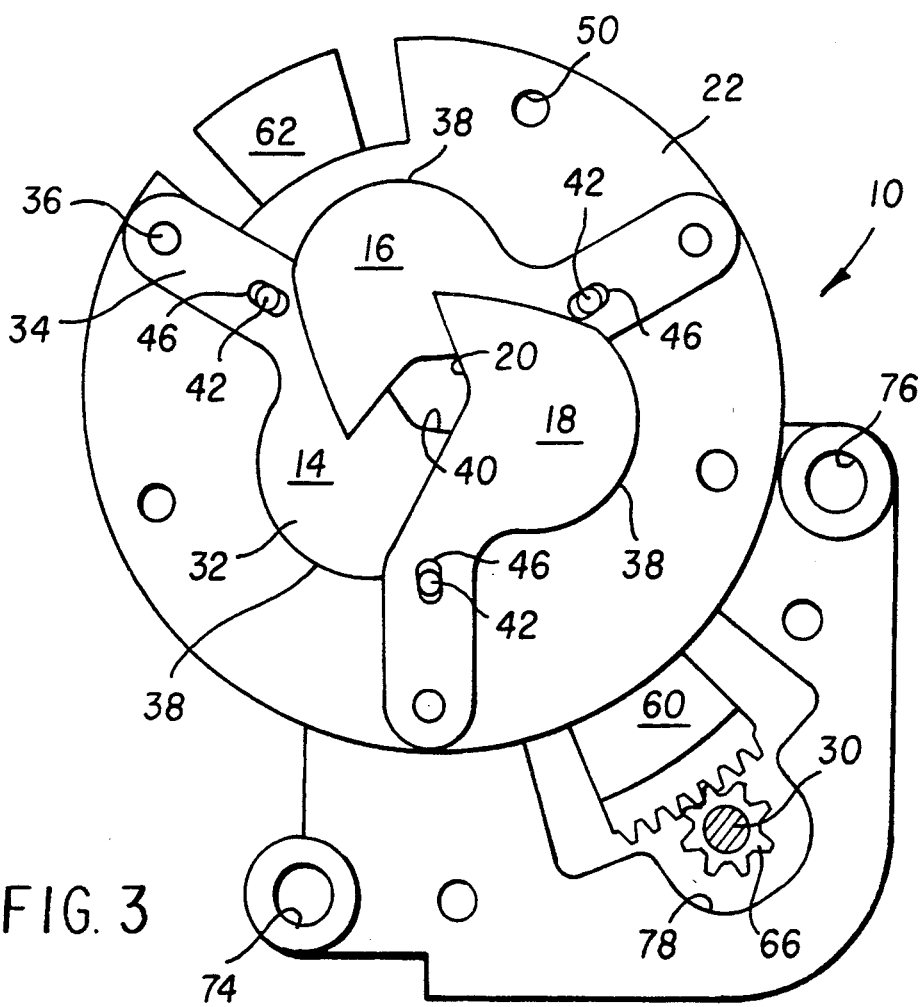
FIG. 3 is a front plan view of the combined aperture and shutter with housing portions removed to reveal the relationships of the respective elements.

Referring first to FIGS. 1 and 3, a combined shutter and adjustable aperture 10 is depicted for use with a photographic camera indicated generally by the numeral 12. Although the details of the camera are not shown, a preferred camera is disclosed in commonly-assigned, copending U.S. patent application Ser. No. 08/024,033, filed on Mar. 1, 1993 in the name of Peter Labaziewicz, the disclosure of which hereby is incorporated by reference into the present application.

The combined shutter and aperture 10 includes a plurality of shutter blades 14, 16 and 18, that also cooperate to define an adjustable camera exposure aperture 20 (FIG. 3). The blades are captured adjacent a separator plate 22 within a housing section 24, between the housing section and a retainer 26, and are driven to move between a closed or aperture blocking position and a plurality of open or aperture defining positions by a actuation ring 28 and stepper motor 30.

The three shutter blades 14, 16, and 18 are identical in configuration and are composed of very thin and flexible sheet metal or opaque plastic having an aperture-blocking section 32 and an actuating arm 34. The arm 34 is pivotally mounted on a pivot pin 36, fixed to the housing section 24, so the blades can pivot about the pin between their closed and plurality of open positions. In the closed position, the aperture blocking sections 32 of the respective blades cooperate as depicted in FIG. 1 to block exposures. Together the back semi-circular portion 38 of the blades define a substantially circular shutter having a diameter sufficient to block illumination from reaching film in the camera through its optical system. As the blades pivot about pin 36 into their open positions, the v-shaped front portions 40 of the blades cooperate to define the adjustable aperture 20, depicted in FIG. 3, approximating a circle centered on the camera's optical axis. The size of the aperture is determined by the amount of pivotal movement of the blades about pin 36. In this manor the blades act like a conventional iris-type adjustable aperture. After a proper exposure, the blades are pivoted about pin 36 to return to their closed position where they again block the aperture and function as a shutter to discontinue the exposure duration.

The blades 14, 16, and 18 are driven between their closed and open positions by a plurality of drive pins 42, one for each blade, that are fixed to the actuation ring 28 and extend through arcuate openings 44 in the separator plate into driving engagement with slots 46 in the blades. The separator plate remains stationary relative to the housing section 24 and is mounted thereon by screws, not shown, that extend through holes 48 and 50 in the retainer and separator plate, respectively, and into threaded holes 52 in the housing section 24. The stationary separator plate captures the actuation ring 28 in an annular recess 54 in the housing section between the housing section and the separator plate.

The actuation ring 28 includes a central circular aperture 56 received over three bosses 57 that are part of an annular hub 58 in the housing section. The dimensions of the hub (including the bosses) and the ring are selected to permit rotation of the ring on the hub without significant play. Such rotation occurs about a central point coincident with the aperture and optical axis of the camera. The actuator ring includes first and second radially opposed extensions 60 and 62, respectively. The extension 60 carries a sector gear 64 that is driven by the stepper motor 30 through a drive pinion 66. The opposed extension 62 is or carries a counterweight for balancing the mass of the gear and canceling inertial forces on said ring that otherwise might accidentally open the shutter if the camera is dropped or bumped.

The stepper motor 30 is secured to the housing section 24 by fasteners, not shown, that extend through and between holes 70, and 72 in a flange on the stepper motor and corresponding holes 74 and 76 in the housing section. When so mounted on the housing section, the pinion 66 of the stepper motor resides in a recess 78 in the housing section in engagement with driven sector gear 64 of the actuator ring 28.

The combined shutter and adjustable aperture 10 includes a mechanism for dampening oscillations caused by operation of the stepper motor. According to this preferred embodiment, the extension 60 of the actuation ring 28 includes a resilient element 80 that urges said drive and driven gears radially together and similarly urges the actuation ring 28 into engagement with hub 58. This resilient force increases the contact friction at the gears and at the hub and thereby dampens vibrations substantially uniformly in the closed and open positions of the blades. It also ensures more precise contact between the various operating parts of the drive mechanism.

Figure 2:
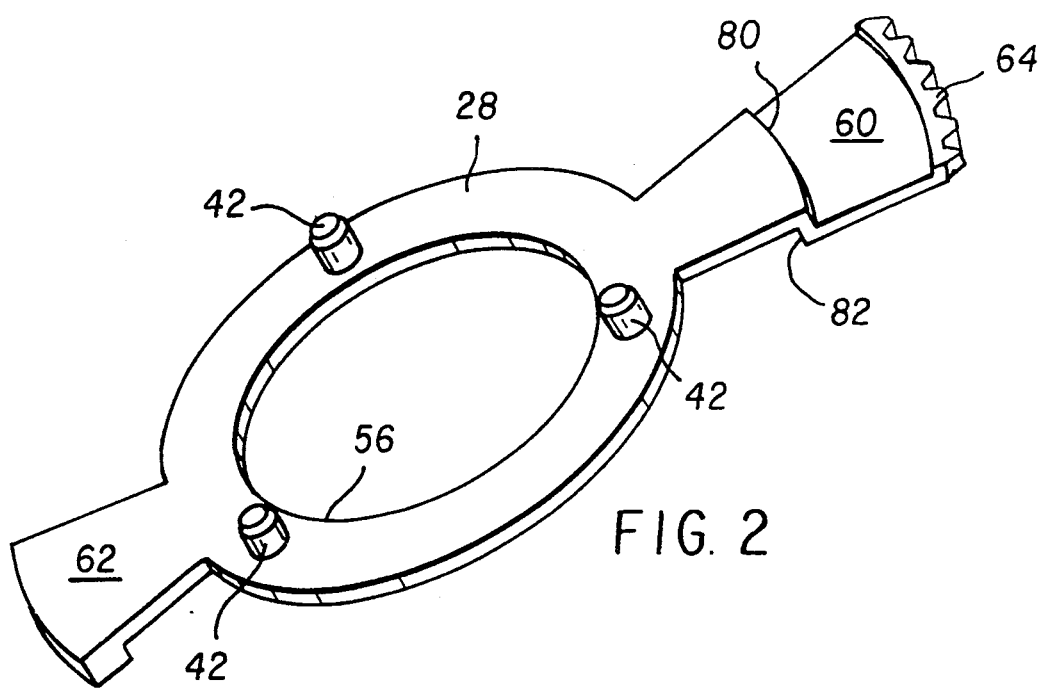
FIG. 2 is a perspective view of an actuator ring including damping means according to the preferred embodiment.

The resilient element 80 is defined by forming the actuation ring 28 of plastic or other resilient material and including bends in the material that define a flexible section 82, FIG. 2, extending at an angle, in this case ninety degrees, to the direction the force is applied. In addition, the dimensions of the parts and their locations are chosen to provide a slight interference fit between the parts, causing the section 82 to flex, applying a resilient force in the radial direction relative to the drive pinion 66, the driven sector gear 64 and the actuation ring 28.

In operation the shutter blades 14, 16, and 18 are driven under the control of stepper motor 30 between a closed position, acting like a shutter, and a plurality of open positions defining exposure apertures. Exposure time also is controlled by the stepper motor, which drives the shutter closed at the end of the desired exposure duration. The stepper motor controls movement of the blades through a drive train that includes pinion gear 66, sector gear 64, actuation ring 28 and drive pins 42, which engage the blades at slots 44. Rotational movement of the actuation ring and drive pins cause the blades to pivot about pins 36 between the closed and open positions of the blades.

Uniform damping is provided in the drive train upstream of the shutter blades by resilient element 80, which exerts a radial force urging the pinion and sector gears together and also resiliently urging the circular aperture 56 of the actuation ring into engagement with the annular hub 58 of the housing. In this preferred embodiment, the damping results from friction between the gear teeth and at the hub. The friction resists or slows movement and thereby reduces the impact of high torque and transient forces early in the drive train and before such forces reach the shutter blades. Contrary to the usual objective of reducing friction between moving parts, the present invention increases the friction to reduce oscillations.

The second radial extension 62 is opposed to the sector gear and adds an opposing mass or counterweight that prevents accidental opening of the shutter if the camera is dropped or handled roughly.

It should be evident from the foregoing description that the invention is not limited to the particular details of the preferred embodiment. It therefore is contemplated that the claims should be interpreted to cover other modifications and applications that do not depart from the true spirit and scope of the invention.

| PARTS LIST FOR FIGURES | |
|---|---|
| Reference Number | Part |
| 10 | Combined shutter and adjustable aperture. |
| 12 | Photographic camera. |
| 14 | Shutter blade. |
| 16 | Shutter blade. |
| 18 | Shutter blade. |
| 20 | Adjustable exposure aperture. |
| 22 | Separator plate. |
| 24 | Housing section. |
| 26 | Retainer. |
| 28 | Actuation ring. |
| 30 | Stepper motor. |
| 32 | Aperture blocking section. |
| 34 | Actuating arm. |
| 36 | Pivot pin. |
| 38 | Back semi-circular portion. |
| 40 | V-shaped front portion. |
| 42 | Drive pin. |
| 44 | Arcuate opening. |
| 46 | Slot. |
| 48 | Hole. |
| 50 | Hole. |
| 52 | Threaded hole. |

-continued

PARTS LIST FOR FIGURES

| Reference Number | Part |
| --- | --- |
| 54 | Annular recess. |
| 56 | Central circular aperture. |
| 57 | Boss. |
| 58 | Annular hub. |
| 60 | First extension. |
| 62 | Second extension. |
| 64 | Driven sector gear. |
| 66 | Drive pinion. |
| 70 | Hole. |
| 72 | Hole. |
| 74 | Hole. |
| 76 | Hole. |
| 78 | Recess. |
| 80 | Resilient element. |
| 82 | Flexible section. |

What is claimed is:

1. A combined shutter and adjustable aperture having a plurality of blades coupled through a drive train to a stepper motor for controlling movement of said blades between a closed position and a plurality of open positions, the open positions defining exposure apertures, characterized in that:

said drive train includes resilient means for increasing friction substantially uniformly in said plurality of positions, to dampen oscillations caused by operation of said stepper motor.

2. A combined shutter and adjustable aperture according to claim 1, wherein said drive train includes a drive gear and a driven gear and said friction increasing means is a resilient element that urges said drive and driven gears together substantially uniformly in all open positions of said blades.

3. A combined shutter and adjustable aperture according to claim 2, wherein said drive train includes an actuation ring, said driven gear is a sector gear extending from said actuation ring, and said actuation ring includes a counter weight disposed on said ring opposite said sector gear for balancing inertial forces on said ring.

4. A camera including a combined shutter and aperture having at least one blade coupled to a stepper motor through an actuation ring for controlling movement of said blade between a closed position and a plurality of open positions, the closed position blocking exposures and the open positions defining exposure apertures, characterized in that:

said stepper motor includes a drive pinion, said actuation ring includes a driven sector gear, and means are provided on said actuation ring for biasing said sector gear radially toward said pinion to increase friction between said sector gear and said pinion to dampen transient forces from operation of said stepper motor.

5. The invention according to claim 4, wherein said biasing means is a resilient portion of said actuation ring.

6. The invention according to claim 5, wherein said resilient portion is a bent section of said actuation ring.

7. A camera including a combined aperture and shutter, comprising:

a plurality of overlapping blades arranged substantially in a common plane;

means mounting said blades for movement radially in the common plane between a plurality of open positions, defining multiple exposure apertures, and a closed position blocking said exposure apertures;

a stepper motor for moving said blades between the closed and open positions, said stepper motor including a drive pinion; and, an actuation ring coupled between said stepper motor and said blades, said actuation ring including first and second radially opposed extensions, one extension carrying a sector gear, and the opposed extension carrying a counterweight for balancing the mass of said sector gear, said actuation ring further including resilient means for biasing said sector gear radially into engagement with said pinion gear.

* * * * *